United States Patent
Kondo et al.

(10) Patent No.: US 6,836,266 B2
(45) Date of Patent: Dec. 28, 2004

(54) ACTIVE MATRIX TYPE DISPLAY

(75) Inventors: Tetsujiro Kondo, Tokyo (JP); Yasushi Tatehira, Kanagawa (JP); Akihiro Okumura, Kanagawa (JP); Takao Inoue, Tokyo (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 09/840,418

(22) Filed: Apr. 23, 2001

(65) Prior Publication Data

US 2002/0030657 A1 Mar. 14, 2002

(30) Foreign Application Priority Data

Apr. 24, 2000 (JP) ........................................ 2000-121903

(51) Int. Cl.[7] .................................................. G09G 3/20
(52) U.S. Cl. ...................................... 345/103; 345/100
(58) Field of Search ........................... 345/100, 55, 88, 345/204, 87, 103, 90, 89, 96; 349/54, 48

(56) References Cited

U.S. PATENT DOCUMENTS

| | | | | |
|---|---|---|---|---|
| 4,781,438 A | * | 11/1988 | Noguchi | 349/54 |
| 4,834,505 A | * | 5/1989 | Migliorato et al. | 349/48 |
| RE33,882 E | * | 4/1992 | Morozumi | 345/88 |
| 5,457,552 A | * | 10/1995 | Ogurtsov et al. | 349/54 |
| 5,479,188 A | * | 12/1995 | Moriyama | 345/89 |
| 5,485,293 A | * | 1/1996 | Robinder | 345/88 |
| 5,508,716 A | * | 4/1996 | Prince et al. | 345/103 |
| 5,953,002 A | * | 9/1999 | Hirai et al. | 345/204 |
| 6,075,505 A | * | 6/2000 | Shiba et al. | 345/87 |
| 6,426,594 B1 | * | 7/2002 | Ito | 315/169.1 |
| 6,496,172 B1 | * | 12/2002 | Hirakata | 345/96 |

* cited by examiner

Primary Examiner—Chanh Nguyen
Assistant Examiner—Uchendu O. Anyaso
(74) Attorney, Agent, or Firm—Frommer Lawrence & Haug LLP; William S. Frommer

(57) ABSTRACT

An active matrix type display includes a pair of substrates, main surfaces thereof facing each other, a plurality of pixels two-dimensionally arranged in a matrix shape on the substrates, scanning lines arranged corresponding to the rows of pixels, signal lines arranged corresponding to the columns of pixels, a row line driving circuit connected to the scanning lines for selecting pixels row by row, a column line driving circuit connected to the signal lines for writing a picture signal to the selected pixels, and a signal processing circuit supplied with a block segmented picture signal having M pixel signals in the column direction and N pixel signals in the row direction and for processing the block segmented picture signal (M and N are positive integers greater than 1) according to a block of m rows by n columns (m and n are positive integers greater than 1).

11 Claims, 13 Drawing Sheets

ACTIVE MATRIX TYPE DISPLAY

BACKGROUND OF THE INVENTION

1. Field of the Invention

The present invention relates to an active matrix type display. More specifically, the present invention relates a drive technique for writing a picture signal on the active matrix type display on a block by block basis.

2. Description of the Related Art

Active matrix type displays such as a liquid-crystal display (LCD) are a next generation display expected to substitute for CRTs (Cathode Ray Tubes), but the inputting of a picture signal is one-dimensionally performed. Specifically, picture data as a raster signal is written on a liquid-crystal panel on a line by line basis (scanning line by scanning line). To observe a picture in a narrow transmission band through NTSC broadcasting using ground waves or analog VCR, one dimensional signal inputting is appropriate.

As compressed digital pictures in a wide transmission band, such as those through satellite communications or DVD (digital versatile disk), are in widespread use as a signal source, these compressed pictures are encoded on a per m-row-by-n-column block basis (m and n are integers greater than 1). To present the encoded compressed signal, the encoded compressed signal needs to be decoded in a one-dimensional format. Since a frame memory is required to decode a picture signal compressed in a two dimensions of m rows by n columns, signal processing efficiency is not so high. It is preferred not to stick to a one dimensional inputting technique as the method of signal inputting in next generation displays. In other words, a method of inputting a picture signal on a per m×n block basis is more efficient. However, a two-dimensional signal inputting technique in an active matrix type display remains to be developed. On the other hand, thinner, more light-weight and lower power consumption design is required of the next generation displays. To this end, the use of a low speed clock in data transfer is effective. As for this requirement, the one-dimensional signal inputting technique is subject to a limitation in the effort of slowing the data transfer speed. The conventional one-dimensional signal input method is not necessarily an appropriate technique in the next generation display, and there is a need for a more efficient block input method. This is further discussed referring to the MPEG (Motion Picture Expert Group) technique.

FIGS. 11A and 11B diagrammatically show an MPEG data processing sequence. An input signal such as a video signal is compressed in an MPEG encoder 11. This compression is performed on a per eight-row-by-eight-column block basis. Specifically, picture data of 8×8=64 dots as one block is subjected to a pixel decimation step or bit decimation step. The compressed MPEG data is processed through a packetization/bit stream circuit 12 and is the transmitted. A receiver side includes an MPEG decoder 13, which develops the compressed data into decompressed raster signal data. A large capacity frame memory 16 is required to convert two-dimensional data, which has been developed on a per block basis, into a one-dimensional raster signal.

FIG. 12 diagrammatically shows the raster signal data of one horizontal period assigned to one scanning line. A data transfer clock CK1 has a frequency of 25 MHz.

FIG. 13 diagrammatically shows an active matrix type display as one example of a conventional receiver set. The raster signal data shown in FIG. 12 is converted into an analog signal by a D/A converter 13x, and is then input to an active matrix type display. As shown, the active matrix type display includes a matrix of pixels formed between a pair of opposing substrates 4 and 5, scanning lines X arranged corresponding to the rows of pixels 3, and signal lines Y arranged corresponding to the columns of pixels 3. In the conventional art, the pixels are formed on the one substrate 4, and a counter electrode (common electrode) 8a is formed on the entire main surface of the other substrate 5. A row line driving circuit 14 and a column line driving circuit 15 are integrally mounted on the pair of substrates 4 and 5, or are arranged separately from the substrates 4 and 5. The row line driving circuit 14 includes a shift register, and is connected to each scanning line X to select the pixels on a row by row basis. The column line driving circuit 15 is connected to each signal line Y and writes a picture signal on a pixel on a selected row. In the circuit shown in FIG. 13, the column line driving circuit 15 writes the picture signal input from the D/A converter 13x on the pixels 3 substantially on a dot at a time basis, on a single row selected by the row line driving circuit 14.

Optionally, the picture signal may be written on the pixels on a plurality of rows (n) that are simultaneously selected. This technique is a multi-pixel simultaneous driving method, but is limited to a simultaneous driving of a plurality of pixels on a single selected row. FIG. 14 shows an example of picture signal supplied to the column line driving circuit 15 from the D/A converter 13. As shown, the column line driving circuit 15 receives n pieces of data in parallel, namely, data 1–data n, corresponding to n pixels to which the picture signal is simultaneously written. In this case, the transfer clock CK2 of the picture signal is reduced to CK1/n. This technique is a one dimensional writing method, and requires a large capacity frame memory to develop an original compressed image.

FIG. 15 shows an active matrix type display working on a line at a time scanning basis. Elements identical to those with reference to the conventional display working on a point at a time scanning basis and shown in FIG. 13 are designated with the same reference numerals. In the line at a time scanning method, input raster signal data is directly input to a column line driving circuit 15. The multiplexed raster signal data is demultiplexed by a demultiplexor in the column line driving circuit 15, is then latched row by row, and is converted into an analog signal by a D/A converter. On the other hand, the row line driving circuit 14 selects a row of pixels on a line at a time basis. The column line driving circuit 15 writes the picture signal, which has been latched and then D/A-converted, simultaneously on all pixels on a selected single row. This method is a typical single dimensional signal input technique.

FIG. 16 is a waveform diagram showing analog signal data output from the D/A converter in the column line driving circuit 15 shown in FIG. 15. In the line at a time scanning technique, the image data of one row on one horizontal period (1H) is successively output to the panel of the display in synchronization with the line at a time scanning operation of the row line driving circuit 14.

SUMMARY OF THE INVENTION

Accordingly, it is an object of the present invention to provide an active matrix type display working on a two-dimensional signal input scheme. To achieve this object, an active matrix type display of the present invention includes a pair of substrates, main surfaces thereof being facing with each other, a plurality of pixels two-dimensionally arranged in a matrix shape on the substrates, scanning lines arranged corresponding to the row of pixels, signal lines arranged corresponding to the column of pixels, a row line driving circuit connected to the scanning lines for selecting pixels row by row, and a column line driving circuit connected to the signal lines for writing a picture signal to the selected pixels, wherein the odd-numbered rows of pixels are assigned to one substrate, and the even-numbered rows of pixels are assigned to the other substrate, the row line driving circuit simultaneously selects the odd-numbered row pixels and the even-numbered pixels, and the column line driving circuit writes the picture signal on each of the simultaneously selected odd-numbered rows of pixels and even-numbered rows of pixels. Specifically, the row line driving circuit simultaneously selects at least a total of four rows of pixels composed of two odd-numbered rows of pixels and two even-numbered rows of pixels, the signal lines are divided into sets of four lines with one set for each column, wherein the two signal lines are arranged on the one substrate and the remaining two signal lines arranged on the other substrate, and the column line driving circuit writes a picture signal on each of the four simultaneously selected pixels assigned to the four rows of pixels, through the set of four signal lines. The column line driving circuit simultaneously applies a picture signal to sixteen signal lines assigned to at least four columns, thereby simultaneously writing the picture signal on sixteen pixels of four rows by four columns.

An active matrix type display of the present invention includes a pair of substrates, main surfaces thereof being facing with each other, a plurality of pixels two-dimensionally arranged in a matrix shape on the substrates, scanning lines arranged corresponding to the row of pixels, signal lines arranged corresponding to the column of pixels, a row line driving circuit connected to the scanning lines for selecting pixels row by row, and a column line driving circuit connected to the signal lines for writing a picture signal to the selected pixels, wherein a plurality of rows of pixels in an odd-numbered group is assigned to the one substrate, a plurality of rows of pixels in an even-numbered group is assigned to the other substrate, the signal lines are divided into sets of a plurality of lines with one set assigned to each column, signal lines, of the set, having the number equal to the number of rows in the odd-numbered group are arranged on the one substrate, and the remaining signal lines, of the set, having the number equal to the number of rows in the even-numbered group are arranged on the other substrate, and the column line driving circuit respectively writes the picture signal on each of a plurality of pixels in the odd-numbered group and the even-numbered group simultaneously selected, through each set of the plurality of signal lines per column of pixels.

An active matrix type display of the present invention includes a pair of substrates, main surfaces thereof being facing with each other, a plurality of pixels two-dimensionally arranged in a matrix shape on the substrates, scanning lines arranged corresponding to the row of pixels, signal lines arranged corresponding to the column of pixels, a row line driving circuit connected to the scanning lines for selecting pixels row by row, a column line driving circuit connected to the signal lines for writing the picture signal to the selected pixels, and a signal processing circuit supplied with a block segmented picture signal having M pixel signals in the column direction and N pixel signals in the row direction (M and N are positive integers greater than 1) and for processing the block segmented picture signal according to a block of m rows by n columns (m and n are positive integers greater than 1), the signal processing circuit outputting the processed signal in the block form to the column line driving circuit, wherein the row line driving circuit simultaneously selects m rows of pixels and the column line driving circuit simultaneously supplies the picture signal to the signal lines of n columns, and thereby picture signal is simultaneously written to pixels of m rows by n columns. Preferably, the signal processing circuit decodes the picture signal, which has been encoded on a per M-row-by-N-column block basis, into a picture signal compatible with pixels of M rows by N columns. The signal processing circuit successively processes the picture signal on the condition of m=M and n=N. The signal processing circuit successively processes the picture signal on condition that m is a measure of M.

In accordance with the present invention, two techniques are combined to accomplish a two-dimensional signal input method. In one technique, pixels and common electrode opposing to the pixels alternatingly arranged between the pair of substrates. The pixels and the common electrode may alternate every row or every two rows to a plurality of rows. The rows of pixel are alternatingly arranged between the two substrates so that at least two rows are simultaneously selected. In this arrangement, the pixels are divided into two groups, one group for the one substrate and the other group for the other substrate with the number of pixels unchanged. This arrangement is equivalent to the doubling of the number of the signal lines. The picture signal is simultaneously written on two pixels arranged in the column direction on two rows simultaneously selected. In accordance with the first technique, the number of pixels simultaneously lit is doubled. In a second technique, each substrate includes each column of pixels associated with at least two signal lines. The pixels in any given column are alternately connected to the two signal lines with one pixel connected to the first signal line, the next pixel connected to the second signal line, the third pixel connected to the first signal line, and so on. Every two scanning lines are connected together. In this way, the picture signal is written on two vertically arranged pixels on two selected rows. The second technique allows to be doubled the number of pixels which become concurrently conductive. With the first technique and the second technique combined, the number of pixels that can be simultaneously lit is quadrupled.

BRIEF DESCRIPTION OF THE DRAWINGS

FIGS. 5A-1, 5A-2 and 5B are plan views showing the structure of the display panel of the present invention;

DESCRIPTION OF THE PREFERRED EMBODIMENTS

Figure 1:
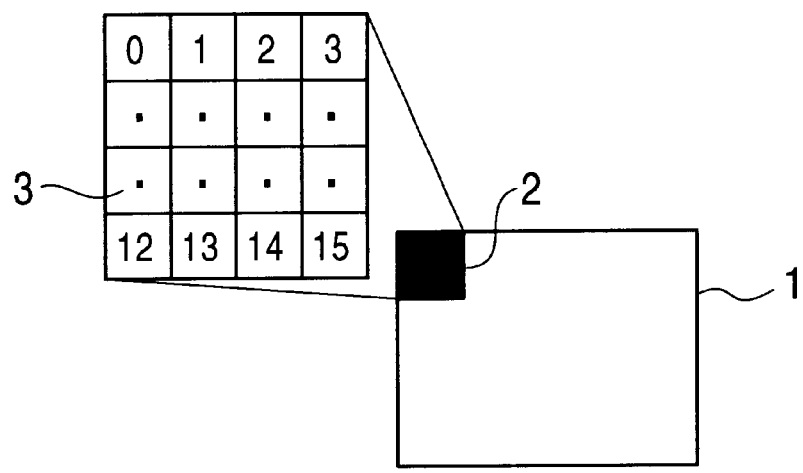
FIG. 1 diagrammatically shows the basic concept of the active matrix type display of the present invention.

Referring to the drawings, the embodiments of the present invention are discussed. FIG. 1 diagrammatically shows the basic concept of the active matrix type display of the present invention. A panel 1 includes a matrix of pixels arranged on a pair of substrates facing each other. The panel 1 includes a plurality of blocks 2, each composed of a plurality of pixels. Each block 2 includes sixteen pixels 3 of four rows by four columns, for example. In accordance with the present invention, a picture signal is simultaneously written on the pixels 3 on a per block basis. In the example shown in FIG. 1, the picture data in a two-dimensional form is simultaneously written on one block of four rows by four columns. Since compressed digital data to be written on the panel 1 is organized on a block by block basis, the compressed digital data is directly decoded to be written on the panel 1 in this driving method. Signal processing is thus efficiently performed.

Figure 2:
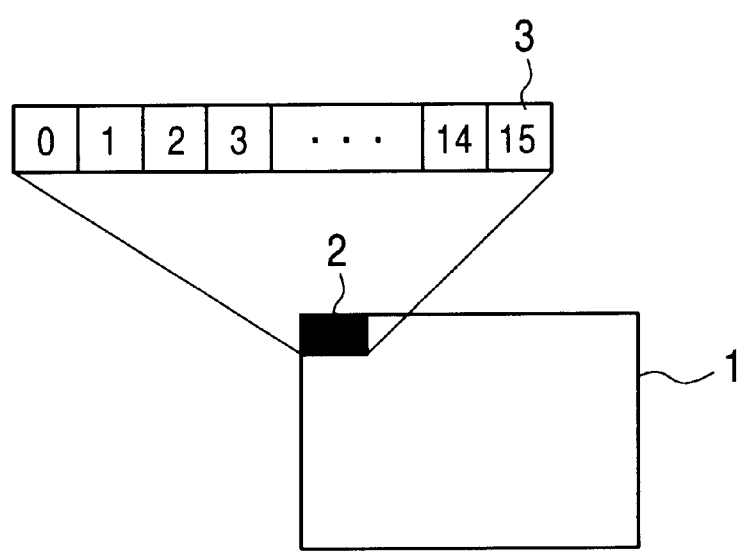
FIG. 2 diagrammatically shows the conventional art.

FIG. 2 diagrammatically shows a conventional multipixel simultaneous driving method. In the conventional driving method, one-dimensionally arranged sixteen pieces of picture data are simultaneously written on each block 2 composed of one row by sixteen columns. The one-dimensional block 2 of one row by sixteen columns is different in form from a two-dimensional block of four rows by four columns in a compressed form. After decompressing the compressed data, the block of four rows by four columns needs to be converted into the block of one row by sixteen columns. The conversion complicates signal processing, and a large capacity frame memory is required to develop the compressed data.

Figure 3A:
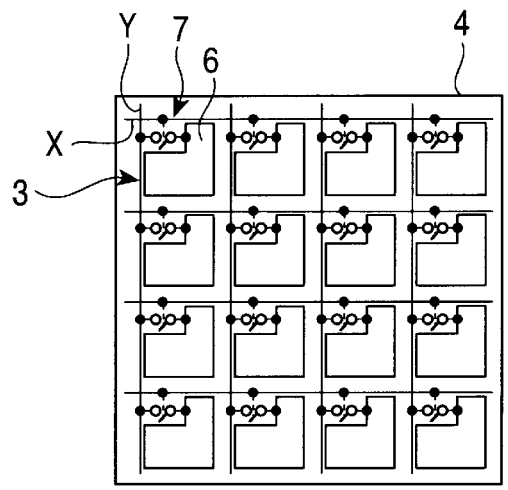
FIGS. 3A and 3B are plan views diagrammatically showing a conventional display panel.
Figure 3B:
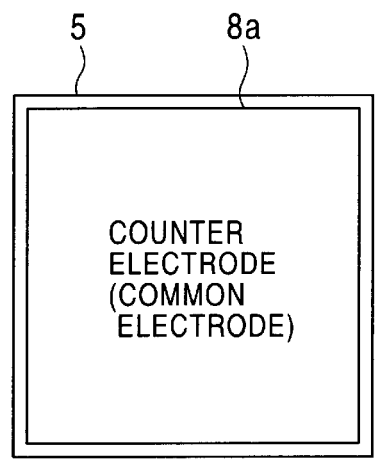

FIGS. 3A and 3B are plan views diagrammatically showing a conventional display panel shown in FIG. 2. One substrate 4 includes scanning lines X arranged in rows, signal lines Y arranged in columns, and a matrix of pixels 3 arranged each intersection of the scanning lines X and the signal lines Y. Each pixel 3 is composed of a pixel electrode 6 and a switching element 7. The switching element 7 is fabricated of a thin-film transistor, for example, with the gate thereof connected to a scanning line X, the source thereof connected to a signal line Y, and the drain thereof connected to the pixel electrode 6. The main surface of the counter substrate 5 is entirely covered with a counter (common) electrode 8a. The substrate 4 and the substrate 5 are bonded together with a liquid crystal as an electrooptical material encapsulated therebetween.

Figure 4A:
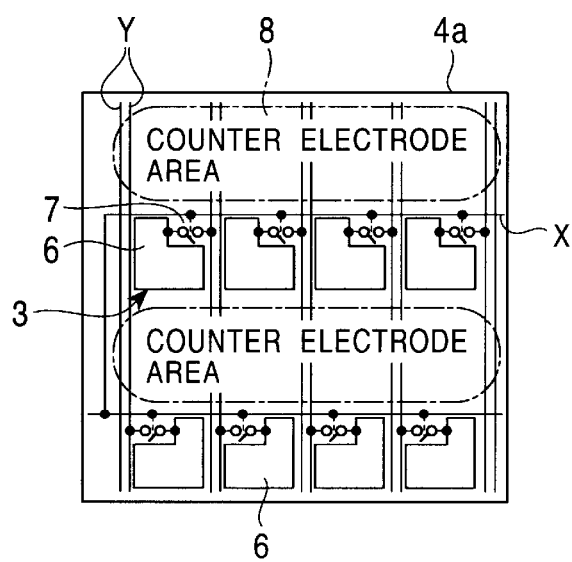
FIGS. 4A and 4B are plan views diagrammatically showing one embodiment of a display panel of the present invention.
Figure 4B:
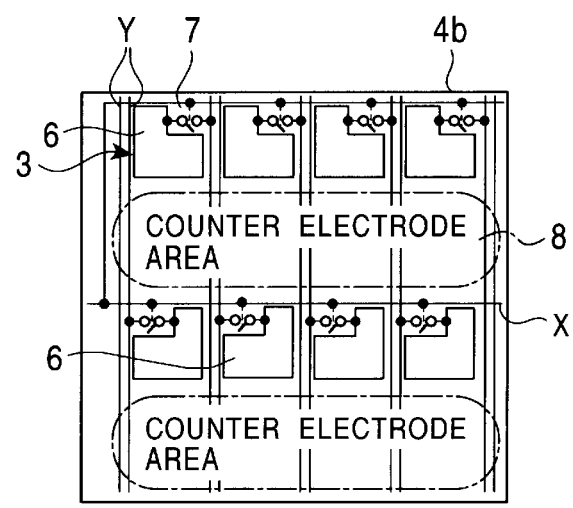

FIGS. 4A and 4B are plan views diagrammatically showing one embodiment of a display panel of the present invention shown in FIG. 1. In FIGS. 4A and 4B, elements identical to those with reference to FIGS. 3A and 3B are designated with the same reference numerals. In the conventional panel shown in FIGS. 3A and 3B, all pixels are formed on the one substrate 4, and the counter electrode only is formed on the other substrate 5. The two substrates have their own different functions in this way. In contrast, the feature of the panel of the present invention shown in FIGS. 4A and 4B lies in that each substrate pixel has a mix of areas and counter electrode areas. Specifically, even-numbered rows of pixels are assigned to one substrate 4a while odd-numbered rows of pixels are assigned to the other substrate 4b. A row line driving circuit (not shown) connected to each scanning line X selects an odd-numbered row of pixels and an even-number of pixels. For example, during a first horizontal period, the row line driving circuit simultaneously selects a first row of pixels 3 formed on the substrate 4b and a second row of pixels 3 formed on the substrate 4a. On the other hand, a column line driving circuit (not shown) connected to each signal line writes a picture signal on each of the pixels 3 on simultaneously selected first and second rows. In this way, the picture signal is simultaneously written on two vertically consecutively arranged pixels in the column. In practice, the row line driving circuit simultaneously selects at least a total of four rows of pixels composed of two odd-numbered rows of pixels and two even-numbered rows of pixels. Specifically, a first row scanning line X and a third row scanning line formed on the substrate 4b are connected together, and the row line driving circuit simultaneously selects the first and third rows of pixels. Similarly, a second row scanning line X and a fourth row scanning line X on the substrate 4a are connected together, and the row line driving circuit simultaneously selects the second and fourth rows. The row line driving circuit therefore selects the first through fourth rows of pixels on the substrates 4a and 4b. On the other hand, the signal lines Y are divided into sets of signal lines, each set including four consecutive signal lines. Two of the four signal lines Y are arranged on the one substrate 4a, and the remaining two signal lines Y are arranged on the other substrate 4b. In this case, the column line driving circuit writes the picture signal on four pixels 3 assigned to the simultaneously selected four rows, through the set of four signal lines Y. The column line driving circuit simultaneously writes the picture signal on sixteen pixels of four rows by four columns simultaneously selected, by simultaneously applying the picture signal to sixteen signal lines Y assigned to at least the four columns. In the above discussion, the horizontal direction of the display screen is assumed to be in the direction of rows, and the vertical direction of the display screen is assumed to be in the direction of columns. Alternatively, the horizontal direction can be in the direction of columns and the vertical direction can be in the direction of rows.

Figures 1, 5A:
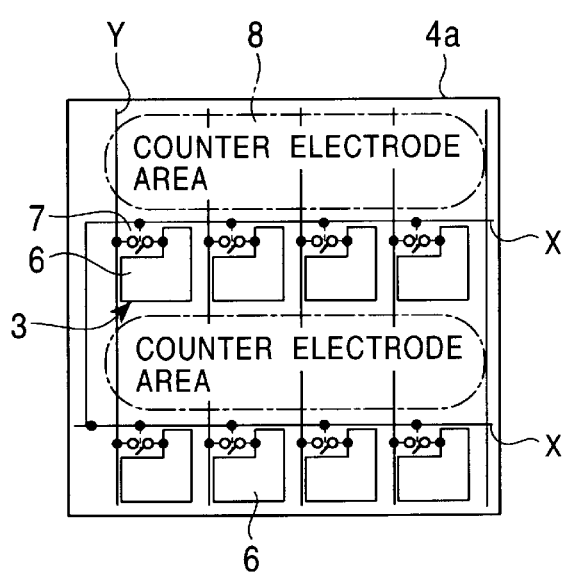
Figures 2, 5A:
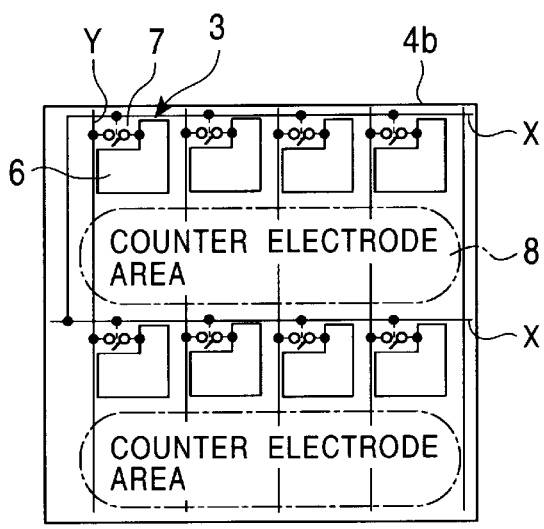

The structure shown in FIGS. 4A and 4B is further discussed referring to exploded views in FIGS. 5A-1, 5A-2, and 5B. FIGS. 5A-1 and 5A-2 diagrammatically show a first feature of the structure of the active matrix type display of the present invention. The first feature of the present invention lies in that pixel areas and counter electrode areas 8 are alternately arranged row by row on the two glass substrates 4a and 4b encapsulating a liquid crystal. In this embodiment, each of the substrates 4a and 4b alternates between the pixel area and the counter electrode area every row. Alternatively, each of the substrates 4a and 4b alternates between the pixel area and the counter electrode area every two rows or every plurality of rows. The rows of pixels are alternately arranged between the two substrates 4a and 4b. If an odd-numbered row and an even-numbered row adjacent thereto are selected at the same time, two pixels that virtually aligned in the column direction are simultaneously driven. The width across the pixel area may or may not be equal to the width across the counter electrode area. In the panel shown in FIGS. 5A-1 and 5A-2, the odd-numbered rows of pixels are arranged on the other substrate 4b and the even-numbered rows of pixels are arranged on the one substrate 4a. With this arrangement, two pixel groups are used in the panel. The pixels are assigned to the two substrates with the number of thereof unchanged. This arrangement is equivalent to the doubling of the number of the signal lines Y on the panel. If the signal line Y formed on the one substrate 4a is overlapped on the respective signal lines Y formed on the other substrate 4b in the direction of thickness of the panel in the same column, the aperture ratio of the pixels is free from dropping. With this arrangement, the number of pixels that are lit at the same time is at least doubled.

Figure 5B:
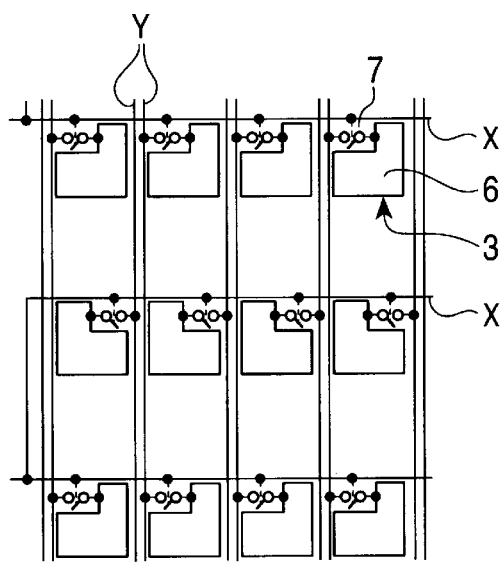

As shown in FIG. 5B, the second feature of the present invention lies in that n signal lines are arranged on a per pixel basis in each substrate. Here, n is a positive integer larger than 1. In the panel shown in FIG. 5B, n is 2. The n signal lines are connected to the respective pixels of every n pixels. As shown, a first row of pixels is connected to one signal line Y, a third row of pixels is connected to the other signal line Y, a fifth row of pixels is again connected to the one signal line Y, and so on. Further, every n lines of the scanning lines X are connected together. In the panel shown in FIGS. 5A-1, 5A-2, and 5B, every adjacent two scanning lines X are connected. With the n scanning lines X in the panel selected, n pixels in each column are simultaneously lit. Since n=2 in the panel shown in FIGS. 5A-1, 5A-2, and 5B, pixels in the first row and the third row are simultaneously drive.

By combining the two structures, one shown in FIGS. 5A-1 and 5A-2 and the other shown FIG. 5B, a segmented block of m×n (m and n are positive integers) is simultaneously lit in a point-at-a-time-scanning display. Even in a line-at-a-time-scanning display, simultaneous writing on a block of m×n is performed. The two-dimensional signal input scheme is thus implemented in both the point-at-a-time-scanning display and the line-at-a-time-scanning display.

The panels shown in FIG. 4A through FIG. 5B, the pixels are alternately assigned to the one substrate and the other substrate every row. The present invention is not limited to this arrangement. As already discussed, the pixels may be alternately assigned to the one substrate and the other substrate every two rows to every plurality of rows. When the pixels are alternately assigned to the substrates every plurality of rows, it is not a requirement that the width across the row in the pixel area be equal to the width across the row in the counter electrode area. When the two widths are not equal, the number of pixels on the one substrate may be smaller or greater than the number of pixels on the other substrate. In the general construction of the display of the present invention, one or a plurality of rows of pixels grouped together is assigned to the one substrate as an odd-numbered group and one or a plurality of rows of pixels grouped together is assigned to the other substrate as an even-numbered group. A plurality of signal lines Y is arranged on each column of pixels, and out of the signal lines Y, signal lines Y of the number equal to the number of rows in the odd-numbered group are arranged on the one substrate, and signal lines Y of the number equal to the number rows in the even-numbered group are arranged on the other substrate. The column line driving circuit writes the picture signal on each of a plurality of pixels belonging to the simultaneously selected odd-numbered group and even-numbered group, through the plurality of signal lines grouped for each column.

Figure 6A:
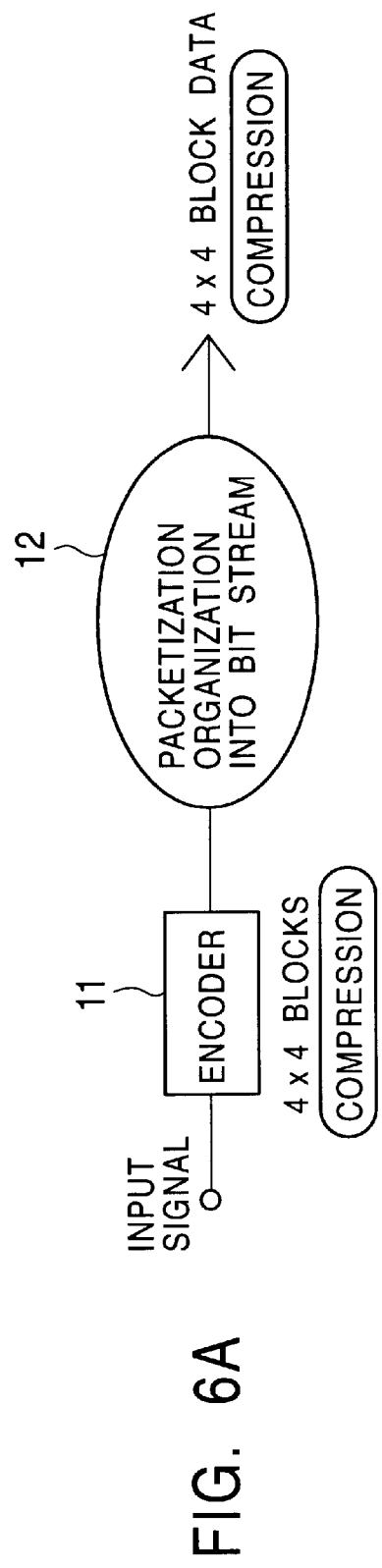
FIGS. 6A and 6B are block diagrams diagrammatically showing a signal source of a compressed image.
Figure 6B:
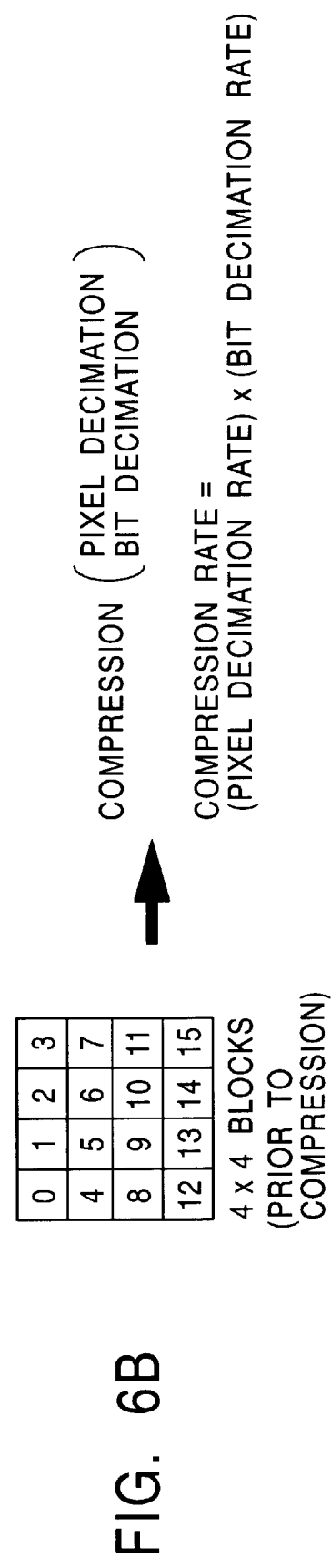

FIG. 6 diagrammatically shows a compression process performed on a per four-row-by-four-column block basis. An input signal, digitalized beforehand by the A/D converter (not shown), is compressed using a pixel decimation technique or a bit decimation technique on a per four-row-by-four-column block basis. The compressed signal is processed through the packetization/bit stream circuit 12, and is then transmitted to a receiver set.

Figure 7:
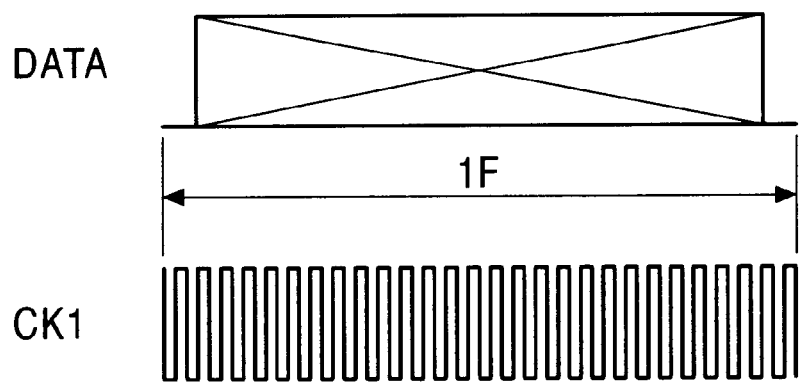
FIG. 7 diagrammatically shows a signal output from the signal source shown in FIGS. 6A and 6B.

FIG. 7 diagrammatically shows a signal transmitted from the signal source shown in FIG. 6. Data is transmitted on a field (1F) by field basis, and a transfer clock for the data transmission is CK1.

Figure 8:
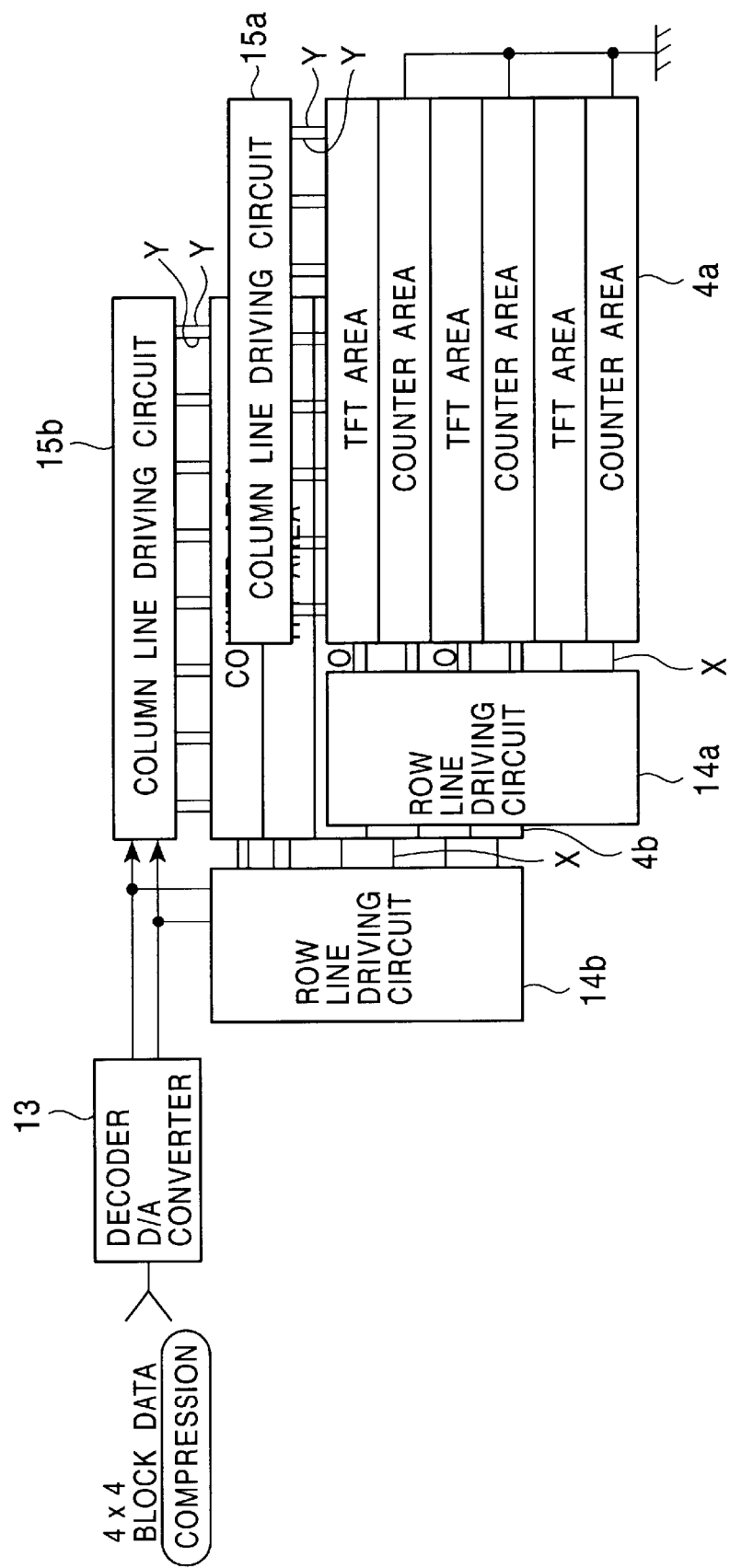
FIG. 8 is a block diagram showing one example of the active matrix type display of the present invention.

FIG. 8 shows one example of the receiver set presenting a picture signal transmitted from the signal source shown in FIG. 6. The receiver set basically employs one of the panels shown in FIG. 4A through FIG. 5B. Specifically, the pixel area and the counter electrode area alternate with each other on each of the pair of substrates 4a and 4b. The receiver set may be integrated with one of the substrates. The pixel area is basically composed of a thin-film transistor (TFT) and a pixel electrode, and is labeled a TFT area. The TFT areas formed on the substrate 4a are odd-numbered rows, and the TFT areas formed on the substrate 4b are even-numbered rows, and the odd-numbered row and the even-numbered row are alternately arranged. The TFT areas formed on the substrate 4a are connected to a row line driving circuit 14a through the scanning lines X. Each column of pixels in the TFT area is provided with two signal lines Y per column, and a column line driving circuit 15a is connected to the signal lines Y. Similarly, the pixels formed on the substrate 4b are driven by the row line driving circuit 14a and the column line driving circuit 15a. The compressed data, supplied from the signal source shown in FIG. 6, is developed and then converted into an analog signal by a decoder-A/D converter 13. The picture signal, developed on a per four-row-by-four-column block basis, is distributed between the column line driving circuits 15a and 15b. Since the column line driving circuits 15a and 15b write the picture signal in a two-dimensional form, there is no need for rearranging the data into a one-dimensional form. A frame memory is thus dispensed with.

Figure 9:
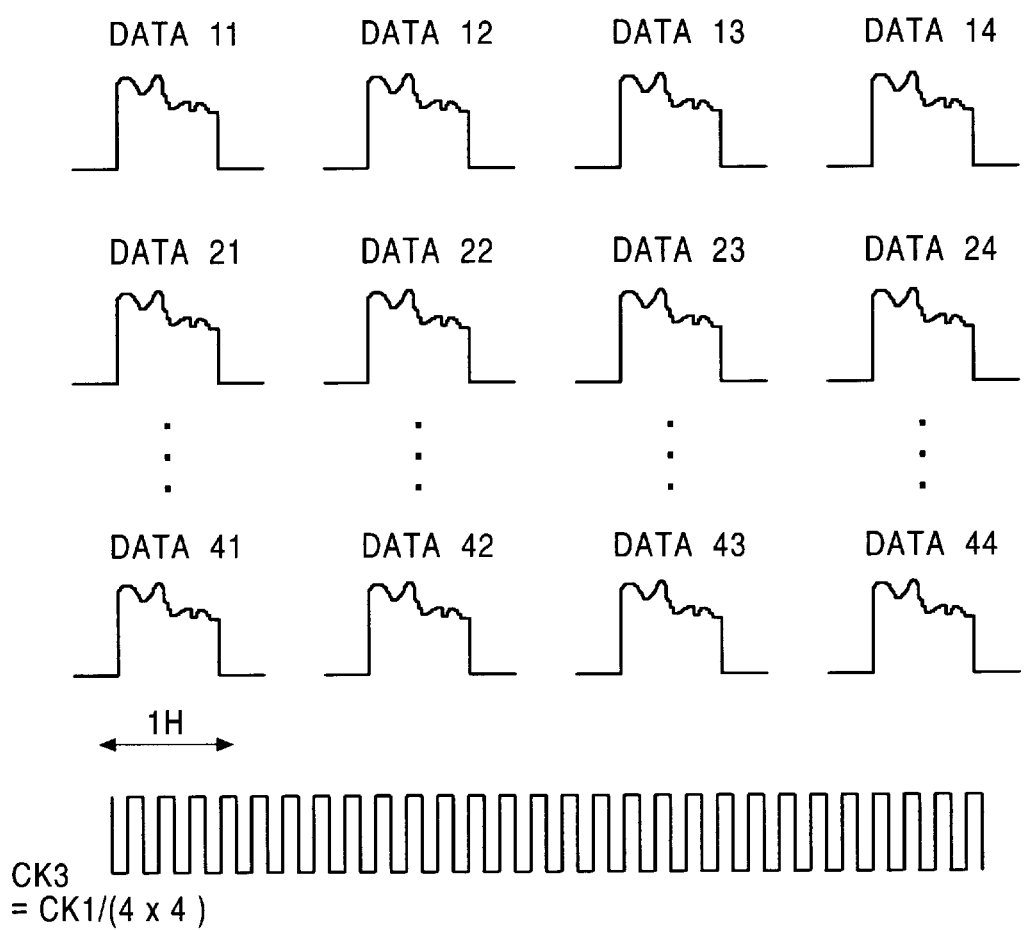
FIG. 9 is a waveform diagram showing the operation of the active matrix type display shown in FIG. 8.

FIG. 9 diagrammatically shows the signal supplied to the column line driving circuits 15a and 15b from the decoder-D/A converter 13 shown in FIG. 8. The decoder-D/A converter 13 shown in FIG. 8 processes data according to the unit of sixteen pixels of four rows by four columns, and sends data 11 through data 44 to the column line driving circuits 15a and 15b through sixteen output lines as shown in FIG. 9. The transfer clock CK3 becomes CK1/(4×4). A matrix of pixels arranged on the panel is segmented into blocks of four rows by four columns. Data 11 is successively written on the pixel at a first row and a first column in each block in response to the transfer clock CK3. Data 44 shown in FIG. 9 is written on the pixel at a fourth row and a fourth column in each block.

Figure 10:
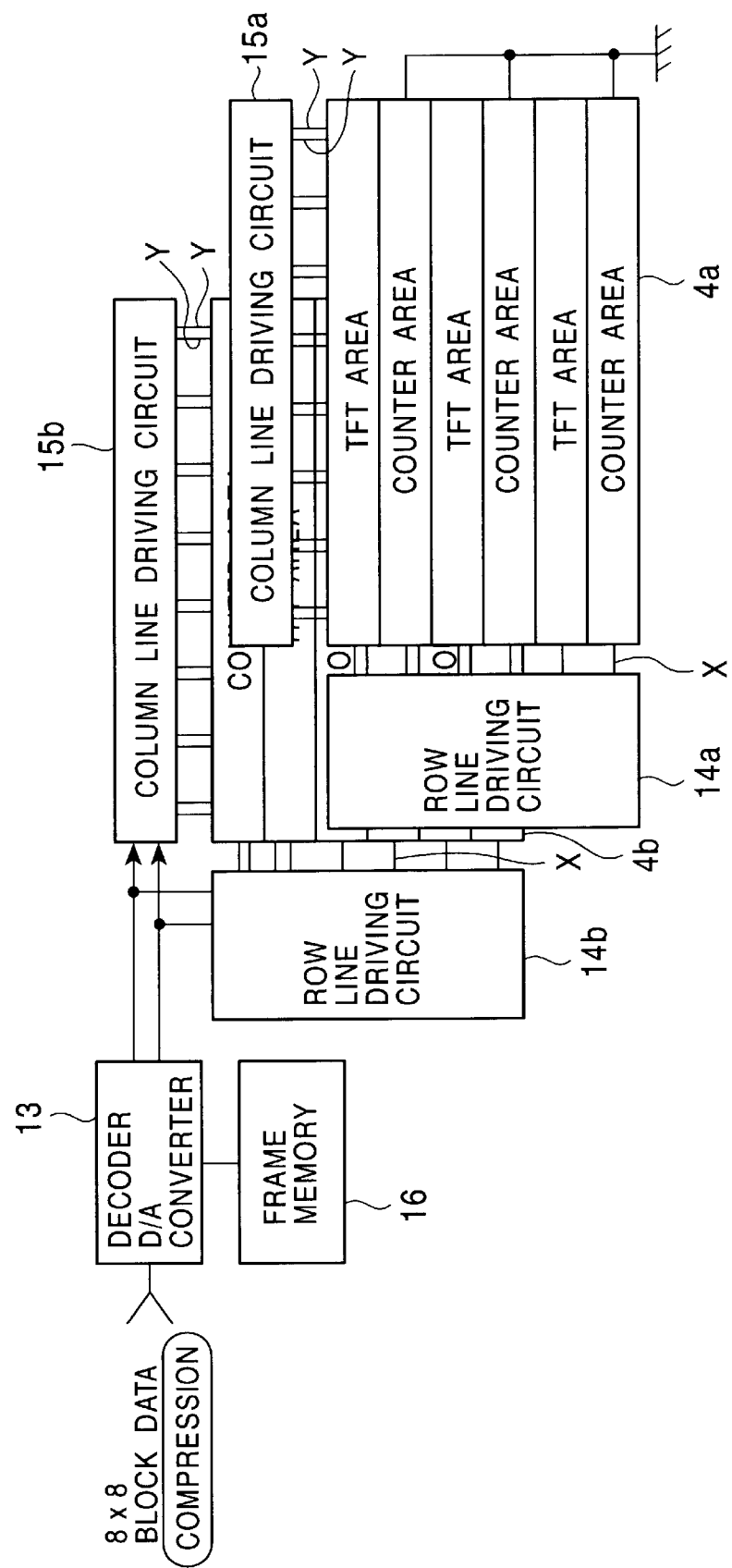
FIG. 10 is a block diagram showing another example of the active matrix type display of the present invention.
Figures 11A, 11B:
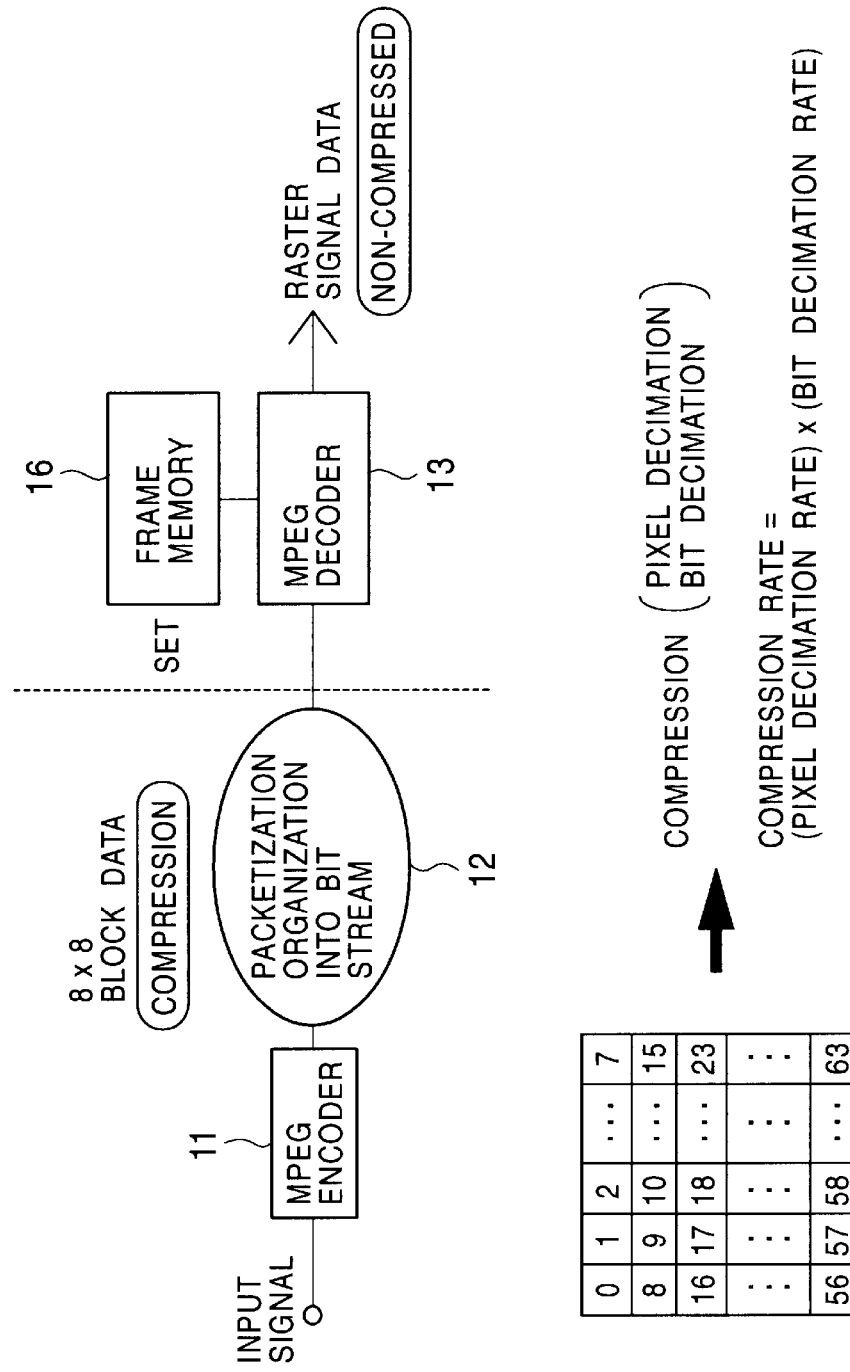
FIGS. 11A and 11B are block diagrams showing a conventional signal processing system complying with the MPEG standard.
Figure 12:
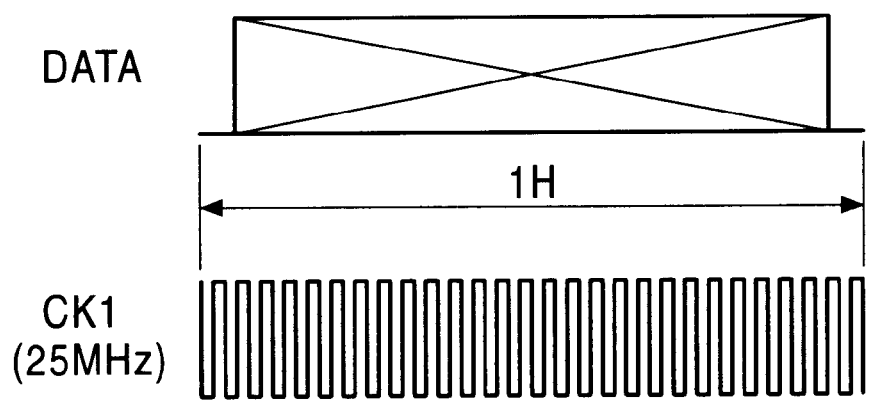
FIG. 12 is a waveform showing the operation of the circuit shown in FIGS. 11A and 11B.
Figure 13:
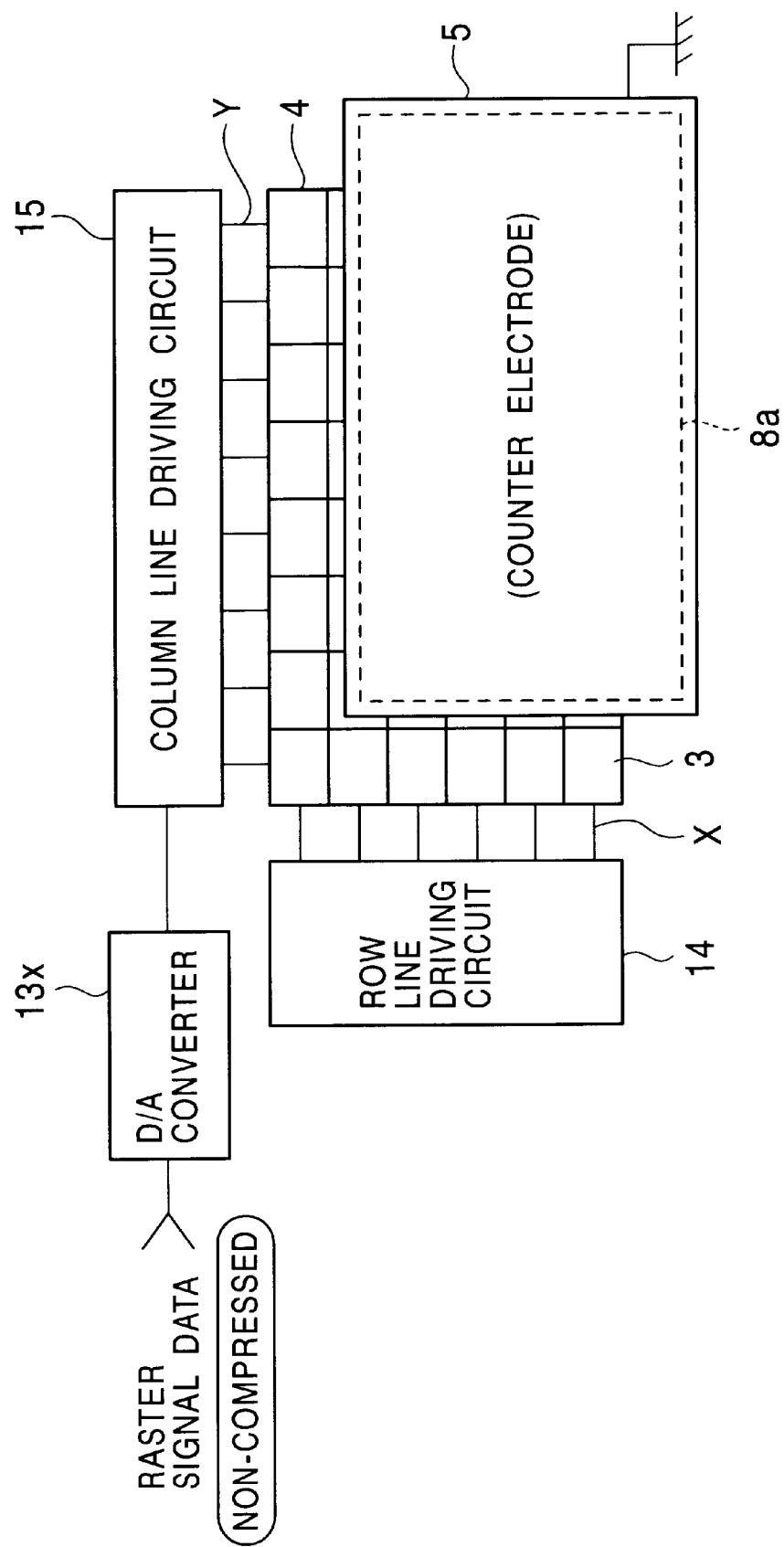
FIG. 13 is a block diagram showing a conventional active matrix type display.
Figure 14:
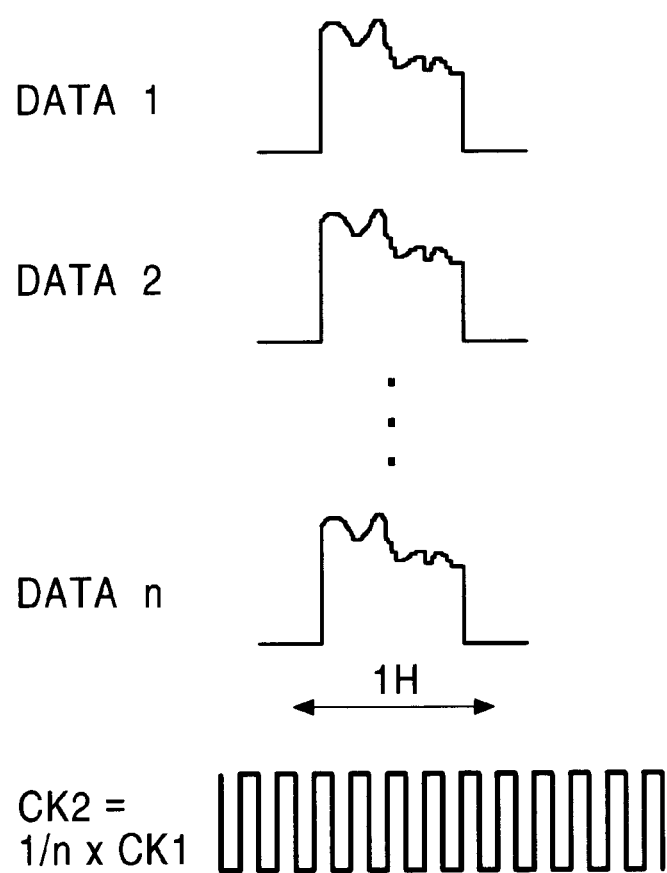
FIG. 14 is a waveform diagram showing the operation of the active matrix type display shown in FIG. 13.
Figure 15:
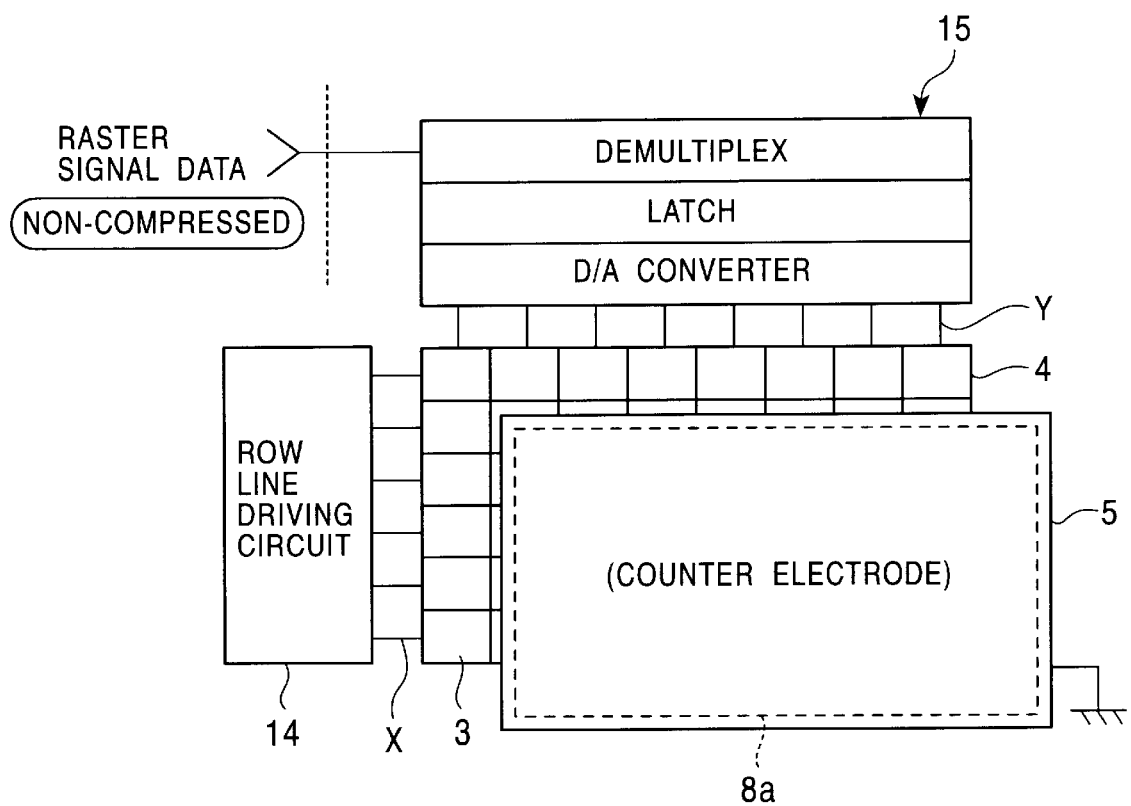
FIG. 15 is a block diagram showing another conventional active matrix type display.
Figure 16:
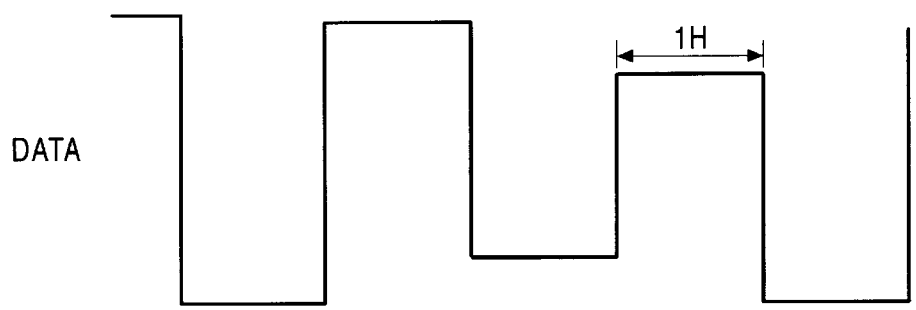
FIG. 16 is a waveform diagram showing the operation of the active matrix type display shown in FIG. 15.

Referring to FIG. 10, data is presented on a per an eight-row-by-eight-column block basis in compliance with the MPEG Standard. The receiver set, having a structure basically identical to that shown in FIG. 8, processes data on a four-row-by-four-column block basis. The decoder-D/A converter 13 in the embodiment shown in FIG. 10 develops eight-row-by-eight-column block data into four-row-by-four-column block data, and then sent the data to the column line driving circuits 15*a* and 15*b*. For this reason, the decoder-D/A converter 13 needs a frame memory 16. Compared with the case in which the two-dimensional form data is converted into the one-dimensional form data, the capacity of the frame memory 16 is small.

Referring to FIG. 8 and FIG. 10, the active matrix type display of the present invention includes a panel composed of a matrix of pixels arranged on the pair of substrates 4*a* and 4*b* facing each other, the scanning lines X corresponding to the rows of pixels, and the signal lines Y corresponding to the columns of pixels. The row line driving circuits 14*a* and 14*b*, the column line driving circuits 15*a* and 15*b*, and the decoder-D/A converter 13 (signal processing circuit) are integrally arranged on the panel or are arranged separately from the panel. The row line driving circuits 14*a* and 14*b* connected to the scanning lines X selects the pixels on a row by row basis. The signal processing circuit 13 decodes the picture signal, which has been encoded on a per M-row-by-N-column block basis, into a picture signal compatible with the pixels of M rows by N columns (M and N are positive integers greater than 1). The column line driving circuits 15*a* and 15*b* write the picture signal on the pixels on a selected row connected thereto. The feature of the present invention lies in that the signal processing circuit 13 successively processes the picture signal, which has been decoded on a per M-row-by-N-column block basis, into a picture signal on a per m-row-by-n-column block basis, and supplies the resulting picture signal to the column line driving circuits 15*a* and 15*b*. The row line driving circuits 14*a* and 14*b* simultaneously selects m rows of pixels. The column line driving circuits 15*a* and 15*b* simultaneously applies the picture signal on n signal lines Y, thereby writing the picture signal on the pixels on a block of m rows and n columns. Referring to FIG. 8, the signal processing circuit 13 successively processes the picture signal with m=M=4 and n=N=4. In the panel shown in FIG. 10, the signal processing circuit 13 processes the picture signal with m being a measure of M. Specifically, m=4 while M=8.

In accordance with the present invention, as discussed above, the display is lit on a block by block basis, and the inputting of the picture signal is performed in a two-dimensional signal input scheme rather than a one-dimensional signal input scheme. The compressed digital data is thus decoded in an interface in the active matrix type display. The active matrix type display thus dispenses with the frame memory which is needed by the conventional one-dimensional signal input scheme. Since the number of pixels simultaneously lit is increased, the operational speed of the display is reduced. The active matrix type display thus assures operational margin in a fast displaying with a frame rate of 120 Hz or higher, and improves a color presentation in a field sequential technique, or the quality of a moving picture in a sub-field technique. During a serial transfer subsequent to a block compression, the display directly receives the data and concurrently decodes and writes the data. The display is thus free from the reduction in the data transfer speed to the display, and consumes less power. A reduced clock frequency and a small circuit scale according lead to a lower power consumption.

What is claimed is:

1. An active matrix type display comprising:

a pair of substrates each having at least one main surface, said main surfaces thereof facing each other;

a plurality of pixels two-dimensionally arranged in a matrix on said pair of substrates, wherein said plurality of pixels are input and written on a two-dimensional block-by-block basis, each row of pixels in said block of pixels of said display comprising less than a complete row;

scanning lines arranged corresponding to a row of pixels;

signal lines arranged corresponding to a column of pixels;

a row line driving circuit connected to said scanning lines for selecting pixels row by row;

a column line driving circuit connected to said signal lines for writing a picture signal to the selected pixels; and a signal processing circuit supplied with a block segmented picture signal having M pixel signals in a column direction and N pixel signals in a row direction and for processing the block segmented picture signal (M and N are positive integers greater than 1), said signal processing circuit outputting the processed signal in block form to said column line driving circuit, wherein said row line driving circuit selects M row lines simultaneously and said column line driving circuit supplies the picture signal to the N signal lines simultaneously, and thereby the picture signal is written to M by N pixels simultaneously.

2. An active matrix type display comprising:

a pair of substrates each having at least one main surface, said main surfaces thereof facing each other;

a plurality of pixels two-dimensionally arranged in a matrix on said pair of substrates, wherein said plurality of pixels are input and written on a two-dimensional block-by-block basis, each row of pixels in said block of pixels of said display comprising less than a complete row;

scanning lines arranged corresponding to a row of pixels;

signal lines arranged corresponding to a column of pixels;

a row line driving circuit connected to said scanning lines for selecting pixels row by row; and a column line driving circuit connected to said signal lines for writing a picture signal to the selected pixels, wherein odd-numbered rows of pixels are assigned to one substrate, and even-numbered rows of pixels are assigned to the other substrate, said row line driving circuit simultaneously selects the odd-numbered row pixels and the even-numbered pixels, and said column line driving circuit writes the picture signal on each of the simultaneously selected odd-numbered rows of pixels and even-numbered rows of pixels.

3. An active matrix type display according to claim 2, wherein said row line driving circuit simultaneously selects at least a total of four rows of pixels composed of two odd-numbered rows of pixels and two even-numbered rows of pixels;

said signal lines are divided into sets of lines with each set including four lines for each column, wherein the two signal lines are arranged on the one substrate and the remaining two signal lines arranged on the other substrate; and said column line driving circuit writes a picture signal on each of the pixels assigned to the four simultaneously selected rows of pixels, through the group of four signal lines.

4. An active matrix type display according to claim 3, wherein said column line driving circuit simultaneously applies the picture signal to sixteen signal lines assigned to at least four columns, thereby simultaneously writing the picture signal on sixteen pixels of four rows by four columns.

5. An active matrix type display comprising:

a pair of substrates each having at least one main surface, said main surfaces thereof facing each other;

a plurality of pixels two-dimensionally arranged in a matrix on said pair of substrates, wherein said plurality of pixels are input and written on a two-dimensional block-by-block basis, each row of pixels in said block of pixels of said display comprising less than a complete row;

scanning lines arranged corresponding to a row of pixels;

signal lines arranged corresponding to a column of pixels;

a row line driving circuit connected to said scanning lines for selecting pixels row by row; and a column line driving circuit connected to said signal lines for writing a picture signal to the selected pixels, wherein one or a plurality of rows of pixels in an odd-numbered group is assigned to the one substrate, one or a plurality of rows of pixels in an even-numbered group is assigned to the other substrate, said signal lines are divided into sets of a plurality of lines with one set assigned to each column, signal lines, of the set, having the number equal to the number of rows in the odd-numbered group are arranged on the one substrate, and the remaining signal lines, of the set, having the number equal to the number of rows in the even-numbered group are arranged on the other substrate, and said column line driving circuit writes the picture signal on each of a plurality of pixels in the odd-numbered group and the even-numbered group simultaneously selected through each set of the plurality of signal lines per column of pixels.

6. An active matrix type display comprising:

a pair of substrates each having at least one main surface, said main surfaces thereof facing each other;

a plurality of pixels two-dimensionally arranged in a matrix on said pair of substrates, wherein said plurality of pixels are input and written on a two-dimensional block-by-block basis, each row of pixels in said block of pixels of said display comprising less than a complete row;

scanning lines arranged corresponding to a row of pixels;

signal lines arranged corresponding to a column of pixels;

a row line driving circuit connected to said scanning lines for selecting pixels row by row;

a column line driving circuit connected to said signal lines for writing a picture signal to the selected pixels; and a signal processing circuit supplied with a block segmented picture signal having M pixel signals in a column direction and N pixel signals in a row direction (M and N are positive integers greater than 1) and for processing the block segmented picture signal according to a block of m rows by n columns (m and n are positive integers greater than 1), said signal processing circuit outputting the processed signal in block form to said column line driving circuit, wherein said row line driving circuit simultaneously selects m rows of pixels and said column line driving circuit simultaneously supplies the picture signal to the signal lines of n columns, and thereby the picture signal is simultaneously written to pixels of m rows by n columns.

7. An active matrix type display according to claim 6, wherein the signal processing circuit decodes the picture signal, which has been encoded on a per M-row-by-N-column block basis, into a picture signal compatible with pixels of M rows by N columns.

8. An active matrix type display according to claim 6, wherein the signal processing circuit successively processes the picture signal on the condition of m=M and n=N.

9. An active matrix type display according to claim 6, wherein the signal processing circuit successively processes the picture signal on condition that m is a measure of M.

10. An active matrix type display according to claim 1, wherein each of signal lines for a column of pixels is arranged for one of M rows which is not selected by the other lines.

11. An active matrix type display according to claim 1, wherein the number of signal lines for a column of pixels is greater than or equal to the number of pixels for a column of pixels each substrate has.

* * * * *